United States Patent
Liu et al.

(10) Patent No.: US 7,984,881 B2
(45) Date of Patent: Jul. 26, 2011

(54) SUPPORT STAND FOR FLAT-PANEL DISPLAY MONITOR

(75) Inventors: Zhi-Bin Liu, Shenzhen (CN); Yi-Qing Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 136 days.

(21) Appl. No.: 12/488,719

(22) Filed: Jun. 22, 2009

(65) Prior Publication Data

US 2010/0102180 A1 Apr. 29, 2010

(30) Foreign Application Priority Data

Oct. 24, 2008 (CN) .......................... 2008 1 0305187

(51) Int. Cl.
*F16L 3/00* (2006.01)
(52) U.S. Cl. ..................... 248/121; 248/917; 361/679.01
(58) Field of Classification Search .................. 248/917, 248/176.1, 309, 142, 121, 125.1, 161; 361/679.01
See application file for complete search history.

(56) References Cited

U.S. PATENT DOCUMENTS

| 7,644,897 | B2 * | 1/2010 | Shin ........................... 248/176.1 |
| 2004/0118984 | A1 * | 6/2004 | Kim et al. ..................... 248/149 |
| 2006/0038092 | A1 * | 2/2006 | Choi ............................ 248/121 |

FOREIGN PATENT DOCUMENTS

| CN | 201100877 Y | 8/2008 |
| DE | 20318580 U1 | 4/2004 |
| JP | 11-184395 A | 7/1999 |

* cited by examiner

*Primary Examiner* — Amy J Sterling
*Assistant Examiner* — Erin Smith
(74) *Attorney, Agent, or Firm* — Clifford O. Chi

(57) ABSTRACT

A support stand for a flat-panel display monitor includes a hinge assembly and a support structure having a top end partially receiving the hinge assembly. The hinge assembly includes a first latching module. The first latching module includes an elastic member and a movable plate connected to the elastic member. The support structure includes a second latching module detachably connected to the first latching module. The second latching module includes a positioning plate having a latching portion extending from a bottom surface thereof. The latching portion is capable of latching with the movable plate. When the movable plate is pressed, the elastic member is deformed so that the second latching module is detached from the first latching module.

20 Claims, 8 Drawing Sheets

SUPPORT STAND FOR FLAT-PANEL DISPLAY MONITOR

BACKGROUND

1. Technical Field

The present disclosure generally relates to support stands and, particularly, to a support stand for a flat-panel display monitor.

2. Description of Related Art

Flat-panel display monitors, such as liquid crystal display monitors, offer advantages over cathode ray tube displays such as reduced size, smaller weight, and better image quality. A viewing angle and height of a flat-panel display screen of the flat-panel display monitor can be adjusted without moving a support stand of the flat-panel display monitor because of its light weight. The support stand is generally detachable relative to the flat-panel display screen, so that it is convenient to package the support stand and the flat-panel display screen in a case for transportation.

Referring to FIG. 8, a typical support stand 100 commonly used for supporting a flat-panel display screen 200 includes a support bracket 102, a pair of clamping members 103 rotatably attached to the flat-panel display screen 200, a torsion spring 104 positioned between top ends of the clamping members 103, and a latching member 105 fixed on a top end of the support bracket 102. Lower ends of the clamping members 103 cooperatively define a clamping space (not labeled) to engage with the latching member 105.

In use, an external force is applied on the top ends of the clamping members 103 to rotate the clamping members 103 towards each other such that the torsion spring is elastically deformed. When the top ends of the clamping members 103 move towards each other, the lower ends of the clamping members 103 move away from each other so that the latching member 105 can be received in the clamping space. After the latching member 105 is received in the clamping space, the external force is released such that the latching member 105 is clamped by the clamping members 103 by an elastic force created by the torsion spring 104.

When the support bracket 102 is to be detached from the flat-panel display screen 200, an external force is applied on the top ends of the clamping members 103 until the latching member 105 is detached from the clamping members 103. The elastic force created by the torsion spring 104 must be sufficient for the clamping members 103 to firmly clamp the latching member 105, so that a large external force is usually required to assemble or disassemble the support bracket 102 to the clamping members 103. Therefore, it is troublesome to assemble or disassemble the support stand 100 from the flat-panel display screen 200. In addition, the torsion spring 104 must deform when the clamping members 103 clamp the latching member 105, so the torsion spring 104 is easily fatigued. Furthermore, the clamping members 103 and the latching member 105 are easily damaged by an excess external force. Thus, a usage life of the support stand 100 is relatively short.

What is needed, therefore, is a support stand for a flat-panel display monitor that overcomes the limitations described.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
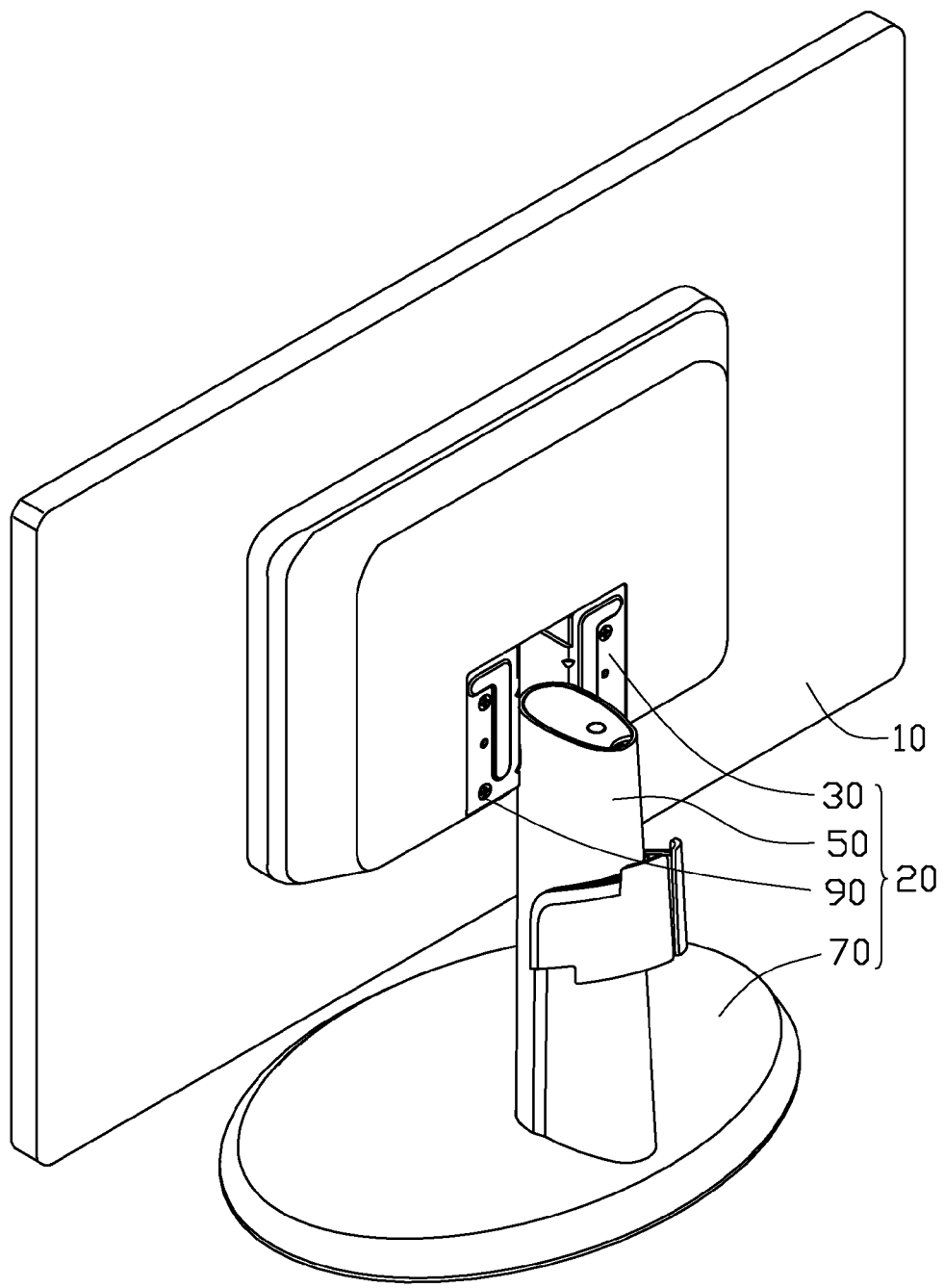
FIG. 1 is an isometric view of one embodiment of a flat-panel display monitor employing one embodiment of a support stand, the support stand including a hinge assembly, a support bracket, and a base member.
Figure 2:
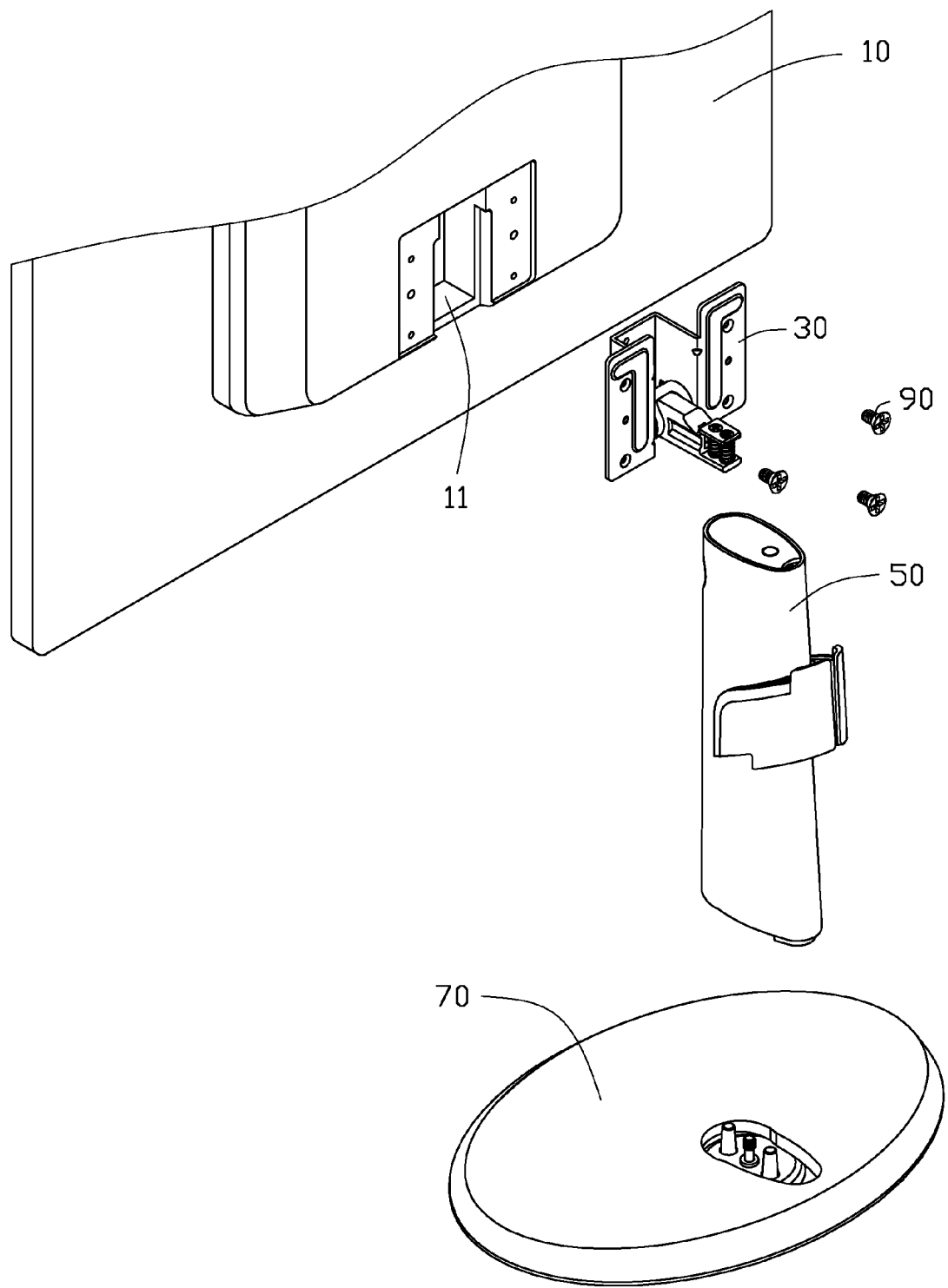
FIG. 2 is a partial, exploded, isometric view of the flat-panel display monitor in FIG. 1.

Referring to FIGS. 1 and 2, one embodiment of a flat-panel display monitor (not labeled) includes a display screen 10 supported by one embodiment of a support stand 20.

The display screen 10 defines a fixing groove 11 in a rear wall (not labeled) of the display screen 10.

The support stand 20 includes a hinge assembly 30 partially received in the fixing groove 11 of the display screen 10, a support structure 50 having a top end connected to the hinge assembly 30, a base member 70 fixed to a lower end of the support structure 50, and a plurality of fasteners 90 for assembling the hinge assembly 30 to the display screen 10.

Figure 3:
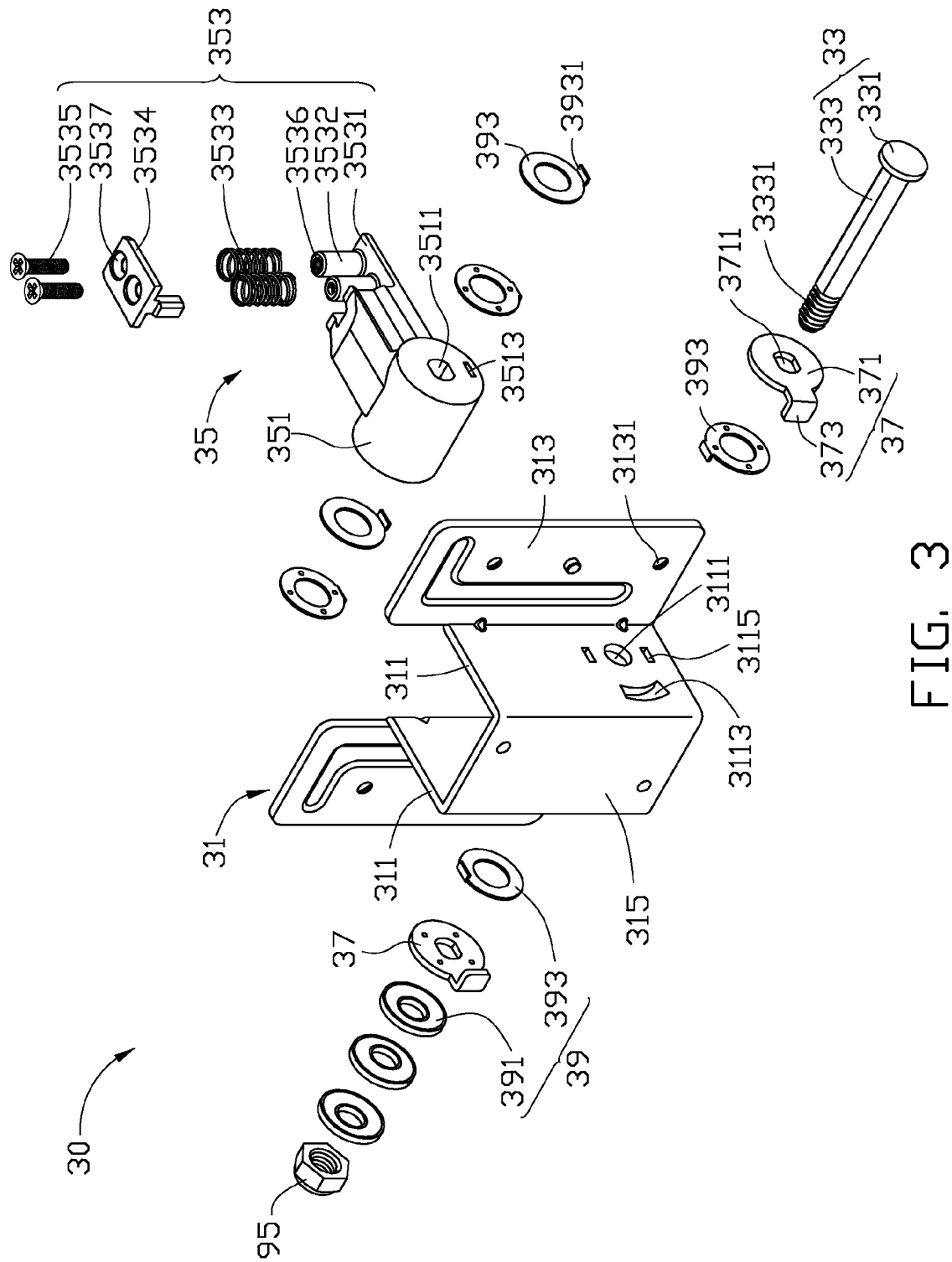
FIG. 3 is an exploded, isometric view of the hinge assembly of the support stand in FIG. 1, the hinge assembly including a first latching module.

Referring also to FIG. 3, the hinge assembly 30 includes a fixing bracket 31, a pivot shaft 33, a rotatable member 35, two restricting members 37, a washer module 39, and a nut 95.

The fixing bracket 31 includes two fixing walls 313, a connecting wall 315, and two support walls 311 extending substantially perpendicularly from opposite sides of the connecting wall 315. The fixing walls 313 respectively extend out from ends of the support walls 311 and are substantially parallel to the connecting wall 315. Each support wall 311 defines a pivot hole 3111, a restricting groove 3113 adjacent to the pivot hole 3111, and two positioning holes 3115 adjacent to opposite sides of the pivot hole 3111. Each fixing wall 313 defines a plurality of mounting holes 3131. The support walls 311 and the connecting walls 315 are configured to be received in the fixing groove 11 of display screen 10.

The pivot shaft 33 includes a substantially cylindrical head 331 and a shaft portion 333 extending from the head 331. A transverse cross-section of the shaft portion 333 is non-circular. The shaft portion 333 defines a plurality of threads 3331 adjacent to an end away from the head 331. The pivot shaft 33 is configured to extend through the pivot holes 3111 of the fixing bracket 31.

The rotatable member 35 includes a substantially cylindrical main body 351 and a first latching module 353. The main body 351 defines a non-circular pivot hole 3511 extending though the main body 351 along a first axis and two fixing positioning grooves 3513 in opposite ends of the main body 351. The first latching module 353 includes a base portion 3531, two guiding poles 3532, and two elastic members 3533, a movable plate 3534, and two threaded fasteners 3535. Each guiding pole 3532 extends substantially perpendicularly from the base portion 3531 and defines a threaded hole 3536 along a second axis substantially perpendicular to the first axis. The elastic members 3533 are respectively sleeved on the guiding poles 3532. The movable plate 3534 defines two substantially circular connecting holes 3537. The threaded fasteners 3535 are configured to extend through the connecting holes 3537 and engage with the threaded holes 3536. A diameter of each connecting hole 3537 is larger than a diameter of a threaded portion of each threaded fastener 3535 such that the movable plate 3534 is movable along the threaded portions of the threaded fasteners 3535. It should be noted that the number of guiding poles 3532, elastic members 3533, or threaded fasteners 3535 is not limited to two, and may be one.

Each restricting member 37 includes a substantially circular main portion 371 and a restricting portion 373 extending from an edge of the main portion 371. The main portion 371 defines a non-circular restricting hole 3711 corresponding to the shaft portion 333 of the pivot shaft 33 such that the pivot shaft 33 non-rotatably passes through the restricting hole 3711. The restricting portion 373 is a substantially rectangular block received in the restricting groove 3113 of the fixing bracket 31.

The washer module 39 includes a plurality of resilient washers 391 and a plurality of tab washers 393. Each resilient washer 391 defines an axial hole (not labeled) in a middle portion thereof. Each tab washer 393 includes a tab 3931 extending from an edge thereof and defines an axial hole (not labeled) in a middle portion thereof. The shaft portion 333 of the pivot shaft 33 rotatably passes through the washer module 39.

Figure 4:
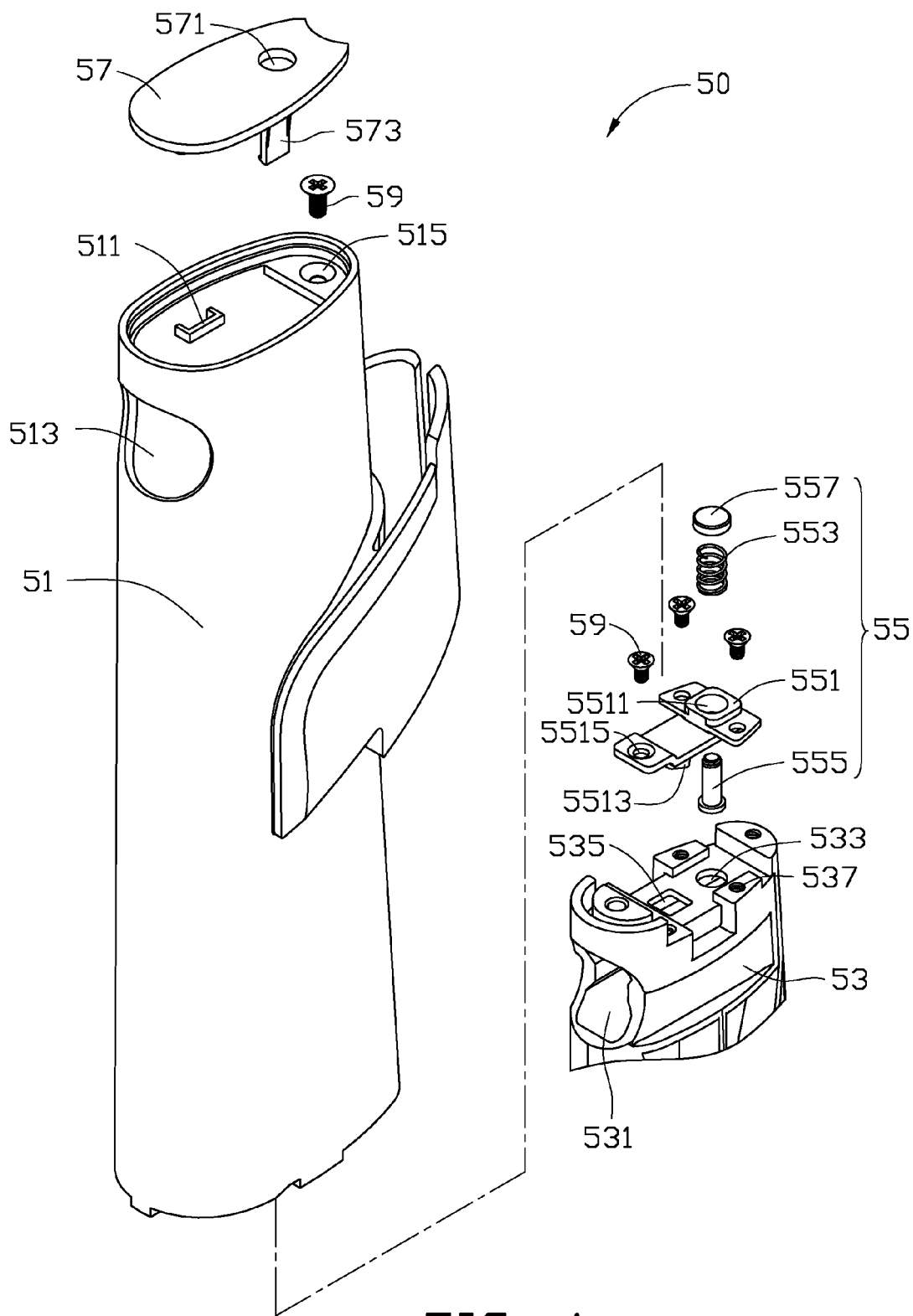
FIG. 4 is an exploded, isometric view of the support bracket of the support stand in FIG. 1, the support bracket including a second latching module.

Referring to FIG. 4, the support structure 50 includes a support housing 51, a support body 53 received in the support housing 51, a second latching module 55, a top lid 57, and a plurality of threaded fasteners 59.

The support housing 51 is a substantially hollow structure and has an elliptical cross-section taken along a plane perpendicular to an extending direction of the support housing 51. The support housing 51 includes a pair of latching blocks 511 extending from an inner surface thereof, and defines a receiving hole 513 through a sidewall thereof and a through hole 515 in a top end.

The support body 53 has a contour corresponding to the elliptical cross-section of the support housing 51 such that the support body 53 is non-rotatably received in the housing 51. The support body 53 defines an assembling chamber 531 in a sidewall corresponding to the receiving hole 513 of the support housing 51. A top portion of the support body 53 defines a connecting hole 533, a positioning hole 535 adjacent to the connecting hole 533, and a plurality of threaded holes 537 around the connecting hole 533. The connecting hole 533 and the positioning hole 535 communicate with the assembling chamber 531. The threaded holes 537 are configured to receive the threaded fasteners 59 such that the support housing 51 is fixed to the support body 53. A bottom portion of the support body 53 defines two pin holes (not shown) and a threaded hole (not shown).

The second latching module 55 includes a positioning plate 551, an elastic member 553, a pressing pole 555, and a press-button 557. The positioning plate 551 defines a guide hole 5511 and a plurality of through holes 5515, and includes a latching portion 5513 extending from a bottom surface of the position plate 551. The latching portion 5513 is substantially a trapezium block received in the positioning hole 535 and includes an oblique surface (not labeled) in an end away from the position plate 551. In assembly, the threaded fasteners 59 pass through the through holes 5515 of the positioning plate 551 and engage with the threaded holes 537 of the support body 53 such that the positioning plate 551 is fixed to the top portion of the support body 53. The elastic member 553 is partially received in the guide hole 551. The pressing pole 555 is positioned in the assembling chamber 531 and passes through the connecting hole 533 of the support body 53, the guide hole 5511 of the positioning plate 551 and the elastic member 553. The press-button 557 is fixed on an upper end of the pressing pole 555 to prevent the elastic member 553 from detaching from the pressing pole 555.

The top lid 57 defines a receiving hole 571 and includes two latching hooks 573 extending from opposite sides of the top lid 57. The latching hooks 573 are latched with the latching blocks 511 of the housing 51 such that the top lid 57 is fixed to the top portion of the support housing 51. The receiving hole 571 is configured to receive the press-button 557.

Figure 5:
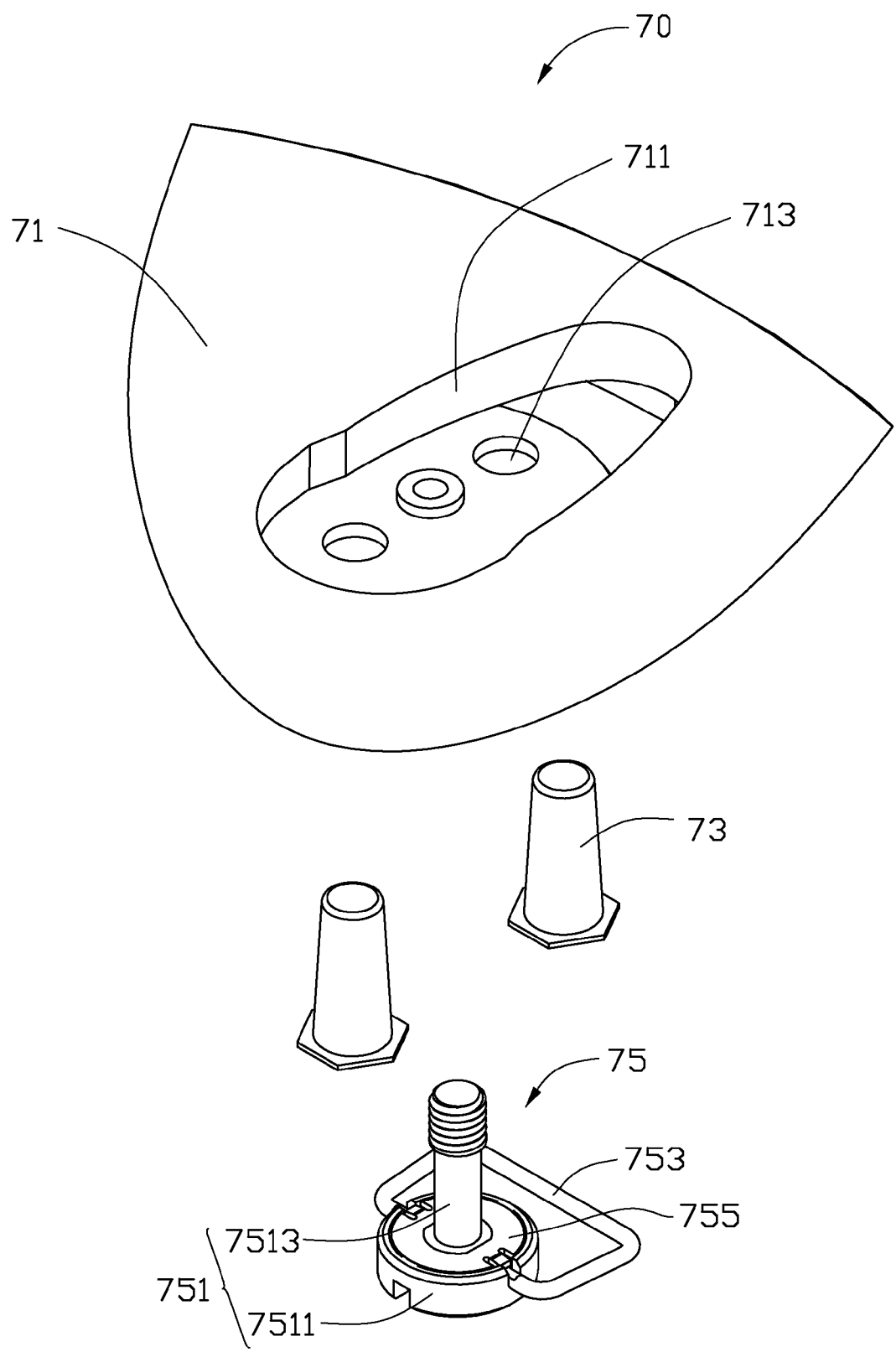
FIG. 5 is an exploded, isometric view of the base member of the support stand in FIG. 1, the base member including an adjusting module.

Referring to FIG. 5, the base member 70 is substantially elliptical and includes a base body 71, two positioning pins 73, and an adjusting module 75.

The base body 71 defines a mounting groove 711 and three though holes 713 in a bottom surface of the mounting groove 711.

The positioning pins 73 pass through two though holes 713 of the base body 71 and are received in pin holes of the support body 53 such that the base body 71 is fixed to the support structure 50.

Figure 6:
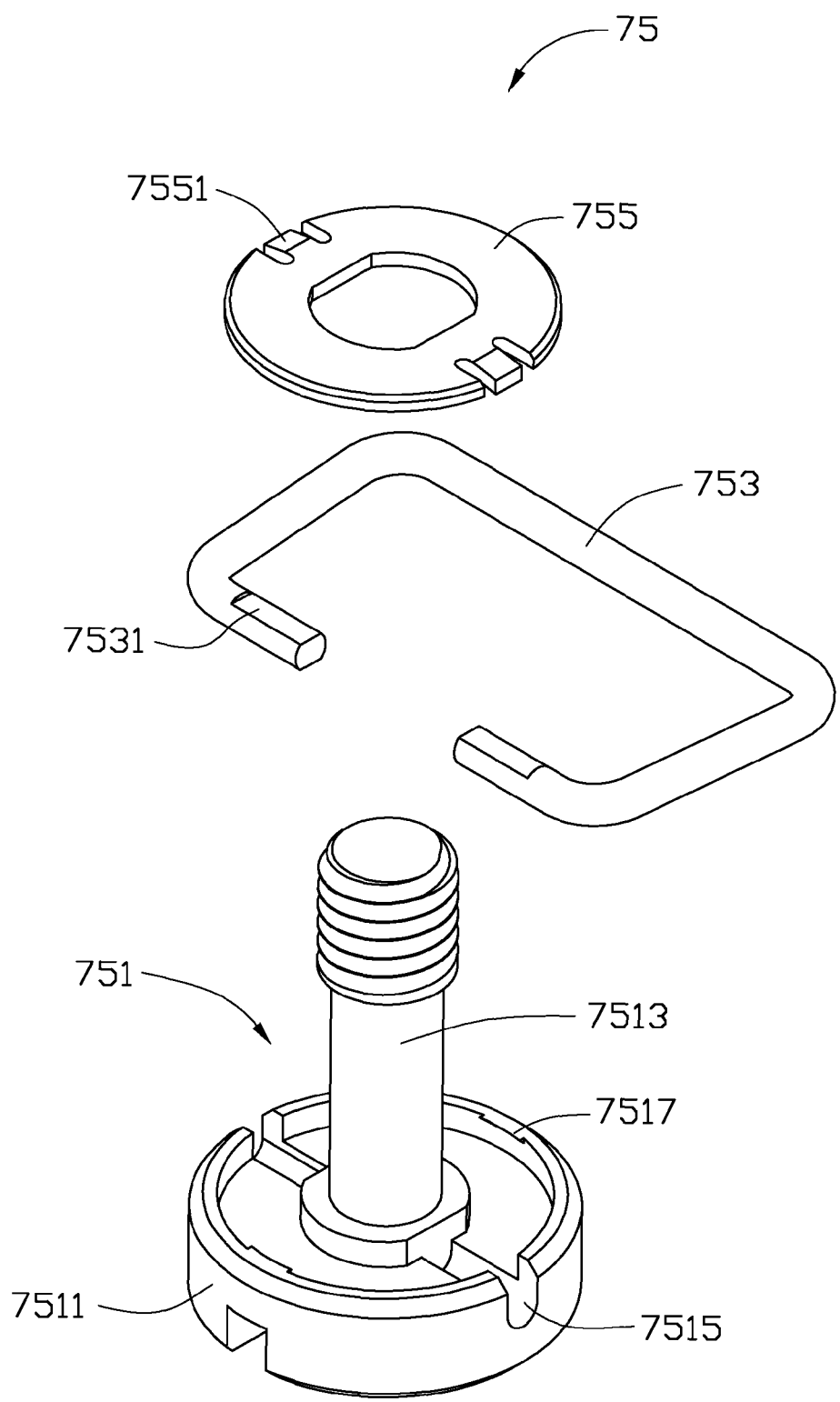
FIG. 6 is an exploded, isometric view of the adjusting module of the base member in FIG. 5.

Referring also to FIG. 6, the adjusting module 75 includes a threaded fastener 751, a handle 753, and a resilient piece 755. The threaded fastener 751 includes a substantially cylindrical head 7511 and a shaft portion 7513 extending from the head 7511. The head 7511 defines a receiving groove 7515 and includes a pair of restricting members 7517 extending inwards from an edge of a cylindrical sidewall of the head 7511. The shaft portion 7513 passes through a central through hole 713 and engages with the threaded hole of the bottom portion of the support body 53. The handle 753 includes two latching ends 7531 to engage in the receiving groove 7515 of the head 7511. The resilient piece 755 includes a pair of latching blocks 7551 extending from opposite sides of the resilient piece 755. The resilient piece 755 is received in the head 7511 and latched by the restricting members 7517 of the head 7511. The latching blocks 7551 are tightly engaged in the receiving groove 7515 of the head 7511 to prevent the latching ends 7531 of the handle 753 from detaching from the receiving groove 7515.

Referring to FIGS. 2 and 3 again, the hinge assembly 30 may be assembled as follows. The shaft portion 333 of the pivot shaft 33 passes (in order) through one of the restricting members 37, one of the tab washers 393, one of the support walls 311 of the fixing bracket 31, two tab washers 393, the rotatable member 35, two tab washers 393, the other support wall 311 of the fixing bracket 31, the remaining tab washer 393, the other restricting member 37, and the resilient washers 391. The nut 95 engages with the threads 331 of the shaft portion 333 of the pivot shaft 33. The tabs 3931 of the tab washers 393 adjacent to the support walls 311 of the fixing bracket 31 are received in the positioning holes 3115 of the support walls 311, and the tabs 3931 of the washer module 39 adjacent to the rotatable member 35 are received in the positioning grooves 3513 of the rotatable member 35. The restricting portions 373 of the restricting members 37 are respectively received in the restricting grooves 3113 of the support walls 311. The pivot shaft 33 is rotatable relative to the fixing bracket 31. The rotatable member 35 and the restricting members 37 rotate with the pivot shaft 33. A rotation range of the pivot shaft 33 is restricted by the restricting grooves 3113 of the fixing bracket 31.

The assembled hinge assembly 30 is partially received in the fixing groove 11 of the display screen 10. A plurality of threaded fasteners of the fasteners 90 pass through the mounting holes 3131 of the fixing wall 313 to fix the hinge assembly 30 to the display screen 10.

Referring to FIG. 4, the display screen 10 and the support structure 50 are connected by the hinge assembly 30. The first latching module 353 of the hinge assembly 30 passes through the receiving hole 513 of the support housing 51 and is received in the assembling chamber 531 of the support body 53. The movable plate 3534 of the first latching module 353 abuts the latching portion 5513 of the positioning plate 551 of the second latching module 55. When an external force is applied on the first latching module 353, the latching portion 5513 presses the movable plate 3534 downwards and compresses the elastic members 3533. Thus, the movable plate 3534 completely moves past the latching portion 5513, and force created between the latching portion 5513 and the movable plate 3534 is eliminated. The elastic members 3533 return the movable plate 3534 to an original position, and the latching portion 5513 is latched in the assembling chamber 531.

Figure 7:
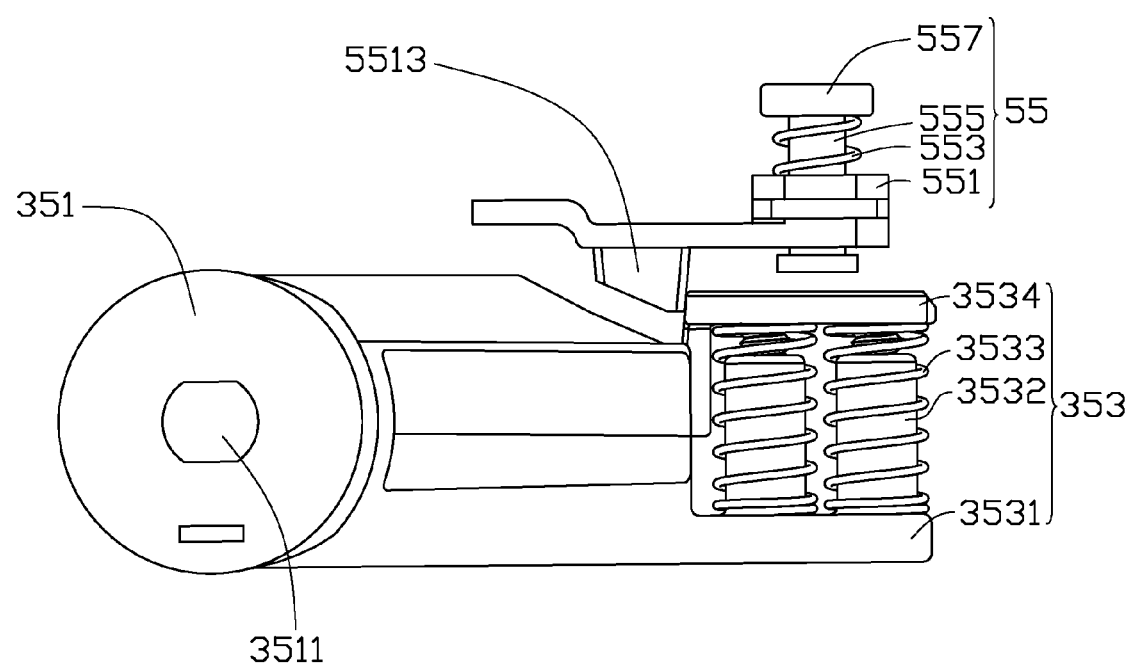
FIG. 7 is a view of the first latching module latched with the second latching module.
Figure 8:
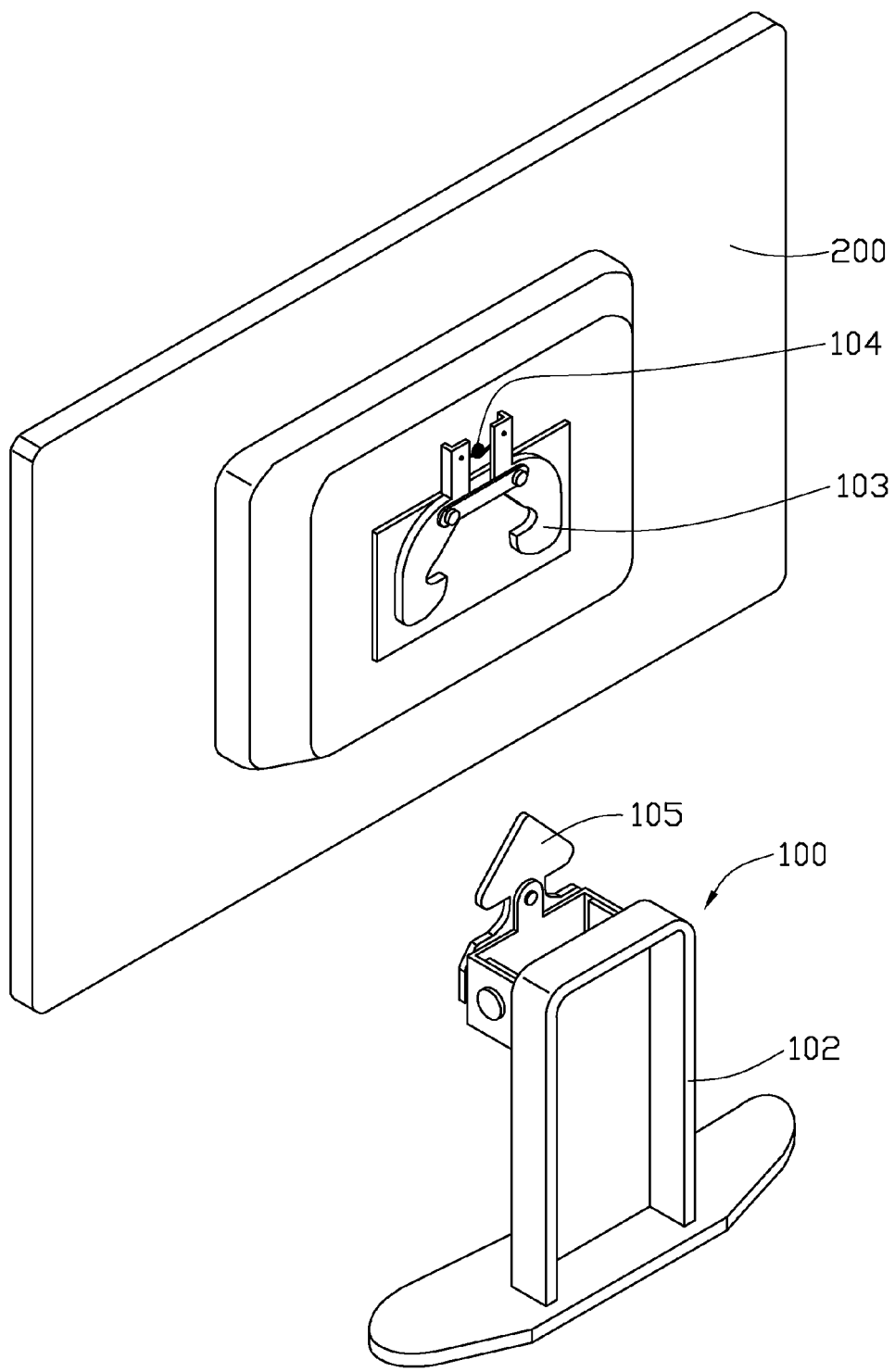
FIG. 8 is an isometric view of a typical support stand commonly used for a flat-panel display screen.

Referring to FIG. 7, when the support structure 50 is to be detached from the display screen 10, another external force is applied to the press-button 557 in the receiving hole 571 of the support structure 50 to compress the elastic member 553, and the pressing pole 555 moves downwards to contact the movable plate 3534. The elastic members 3533 are compressed by the movable plate 3534. Once the movable plate 3534 is below the latching portion 5513, the hinge assembly 30 is withdrawn from the support structure 50, so that the support structure 50 is conveniently detached from the display screen 10.

The elastic members 3533 and the elastic member 553 are only deformed in the process of assembling or disassembling the display screen 10 and the support structure 50, so that the elastic members 3533 and the elastic member 553 have a relatively long usage life. In addition, the hinge assembly 30 is partially received in the support structure 50 when latched with the support structure 50, so that the support structure 50 is firmly connected to the display screen 10 and not easily damaged by an excessive external force. Thus, a usage life of the support stand 20 is relatively long. Further, the handle 753 and the resilient piece 755 are fixed to the threaded fastener 751, so that the support structure 50 can be rapidly detached from the base member 70 when the threaded fastener 751 is loosened by the handle 753.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand for a flat-panel display monitor, the support stand comprising:
a hinge assembly comprising a first latching module, the first latching module comprising an elastic member and a movable plate connected to the elastic member; and
a support structure partially receiving the hinge assembly, the support structure comprising a second latching module detachably connected to the first latching module, wherein the second latching module comprises a positioning plate having a latching portion extending from a bottom surface thereof; the latching portion is capable of latching with the movable plate; when the movable plate is pressed, the elastic member is deformed so that the second latching module is detached from the first latching module.

2. The support stand of claim 1, wherein the first latching module further comprises a base portion and a guiding pole extending from the base portion; the elastic member is sleeved on the guiding pole and positioned between the movable plate and the base portion.

3. The support stand of claim 1, wherein the support structure further comprises a support housing defining a receiving hole adjacent to a top end thereof, in which the first latching module is received; the positioning plate is positioned on the top end of the support housing, with the latching portion extending into the receiving hole to latch with the movable plate.

4. The support stand of claim 1, wherein the support structure further comprises a support housing and a support body non-rotatably received in the support housing; the support housing is a substantially hollow structure and defines a receiving hole adjacent to a top thereof, the support body defines an assembling chamber in a sidewall corresponding to the receiving hole of the housing; the first latching module is received in the assembling chamber; the positioning plate is fixed to a top portion of the support body, with the latching portion extending into the assembling chamber to latch with the movable plate.

5. The support stand of claim 4, wherein the second latching module further comprises an elastic member partially received in the positioning plate, and a pressing pole partially received in the assembling chamber; the pressing pole extends through the positioning plate; the elastic member of the second latching module is sleeved on the pressing pole.

6. The support stand of claim 5, wherein the second latching module further comprises a press-button fixed on an upper end of the pressing pole to prevent the elastic member from detaching from the pressing pole.

7. The support stand of claim 1, wherein the hinge assembly further comprises a pivot shaft and a rotatable member, the rotatable member comprising a main body non-rotatably sleeved on the pivot shaft and the first latching module connected to a side of the main body.

8. The support stand of claim 7, wherein the hinge assembly further comprises a fixing bracket rotatably sleeved on the pivot shaft and a restricting member non-rotatably sleeved on the pivot shaft; the fixing bracket defines a restricting groove and the restricting member comprises a restricting portion received in the restricting groove such that a rotation range of the pivot shaft is restricted.

9. The support stand of claim 8, wherein the fixing bracket comprises two fixing walls, a connecting wall, and two support walls extending substantially perpendicularly from opposite sides of the connecting wall; the fixing walls respectively extend outwards from ends of the support walls and are substantially parallel to the connecting wall; each support wall defining a pivot hole rotatably engaging with the pivot shaft; one of the support walls adjacent to the pivot hole define the restricting groove; the main body is positioned between a space defined by the connecting wall and the support walls; the fixing walls are to be fixed to a display screen of the flat-panel display monitor.

10. The support stand of claim 8, wherein the first latching module further comprises a base portion extending from the side of the main body, a guiding pole extending substantially perpendicularly from the base portion, and a threaded fastener; the guiding pole defines a threaded hole; the elastic member is sleeved on the guiding pole; the movable plate defines a connecting hole; the threaded fastener extends through the connecting hole and engages in the threaded hole such that the movable plate is movable along a threaded portion of the threaded fastener.

11. The support stand of claim 1, wherein the support stand further comprises a base member comprising a base body and an adjusting module; the base body detachably connects to a lower end of the support structure by the adjusting module.

12. The support stand of claim 11, wherein the adjusting module comprises a threaded fastener, a handle, and a resilient piece; the threaded fastener includes a head and a shaft portion extending from the head; the shaft portion extends through the base body and connects to the lower end of the support structure; the head defines a receiving groove; the handle comprises two latching ends to engage in the receiving groove; the resilient piece is latched to the head to prevent the latching ends from detaching from the receiving groove.

13. A flat-panel display monitor, comprising:
a display screen; and
a support stand for the display screen, the support stand comprising:
a hinge assembly comprising a fixing bracket fixed to the display screen and a first latching module connected to the fixing bracket, the first latching module comprising an elastic member and a movable plate connected to the elastic member; and
a support structure partially receiving the hinge assembly, the support structure comprising a second latching module detachably connected to the first latching module, wherein the second latching module comprises a positioning plate having a latching portion extending from a bottom surface; the latching portion is capable of latching with the movable plate; when the movable plate is pressed, the elastic member is deformed so that the second latching module is detached from the first latching module.

14. The flat-panel display monitor of claim 13, wherein the first latching module further comprises a base portion, a guiding pole extending from the base portion, and a threaded fastener; the guiding pole defines a threaded hole; the elastic member is sleeved on the guiding pole; the movable plate defines a connecting hole; the threaded fastener extends through the connecting hole and engages in the threaded hole such that the movable plate is movable along a threaded portion of the threaded fastener.

15. The flat-panel display monitor of claim 13, the support structure further comprising a support housing and a support body non-rotatably received in the support housing; the support housing is a substantially hollow structure and defines a receiving hole adjacent to a top thereof, the support body defines an assembling chamber in a sidewall corresponding to the receiving hole of the housing; the first latching module is received in the assembling chamber; the positioning plate is fixed to a top portion of the support body, with the latching portion extending into the assembling chamber to latch with the movable plate.

16. The flat-panel display monitor of claim 15, wherein the second latching module further comprises an elastic member partially received in the positioning plate, a pressing pole partially received in the assembling chamber, and a press-button; the pressing pole extends through the positioning plate; the elastic member of the second latching module is sleeved on the pressing pole; the press-button is fixed on an upper end of the pressing pole to prevent the elastic member from detaching from the pressing pole.

17. The flat-panel display monitor of claim 13, wherein the hinge assembly further comprises a pivot shaft, a rotatable member, and a restricting member; the fixing bracket is rotatably sleeved on the pivot shaft; the restricting member is non-rotatably sleeved on the pivot shaft; the rotatable member comprises a main body non-rotatably sleeved on the pivot shaft and the first latching module is connected to a side of the main body.

18. The flat-panel display monitor of claim 17, wherein the fixing bracket defines a restricting groove; the restricting member comprises a restricting portion is received in the restricting groove such that a rotation range of the pivot shaft is restricted.

19. The flat-panel display monitor of claim 18, wherein the fixing bracket comprises two fixing walls, a connecting wall; and two support walls extending substantially perpendicularly from opposite sides of the connecting wall, the fixing walls respectively extend out from ends of the support walls and are substantially parallel to the connecting wall; each support wall defines a pivot hole to rotatably engage with the pivot shaft; the restricting groove is defined in one of the support walls adjacent to the pivot hole; the main body is positioned between a space defined by the connecting wall and the support walls; the display screen defines a fixing groove in a rear wall thereof in which the connecting and support walls are received; the fixing walls being fixed to the display screen adjacent to the fixing groove.

20. The flat-panel display monitor of claim 13, wherein the support stand further comprises a base member comprising a base body and an adjusting module; the base body is detachably connected to a lower end of the support structure by the adjusting module.

* * * * *